United States Patent [19]
Eum

[11] Patent Number: 5,813,621
[45] Date of Patent: Sep. 29, 1998

[54] REEL TABLE MOVING MECHANISM OF TAPE RECORDER

[75] Inventor: Jae-yong Eum, Suwon, Rep. of Korea

[73] Assignee: Samsung Electronics Co., Ltd., Kyungki-Do, Rep. of Korea

[21] Appl. No.: 756,246

[22] Filed: Nov. 25, 1996

[30] Foreign Application Priority Data

Dec. 27, 1995 [KR] Rep. of Korea .................. 1995 59532

[51] Int. Cl.⁶ ................................................. G03B 23/02
[52] U.S. Cl. ............................................. 242/336; 360/94
[58] Field of Search ................................. 242/336, 345; 360/93, 94, 96.5, 96.6

[56] References Cited

U.S. PATENT DOCUMENTS

| | | | |
|---|---|---|---|
| 4,664,337 | 5/1987 | Shiratori | 242/336 |
| 4,782,408 | 11/1988 | Inoue et al. | |
| 4,787,572 | 11/1988 | Rademacher | 242/336 |
| 4,984,109 | 1/1991 | Yokoo | 242/336 X |
| 5,082,195 | 1/1992 | Saito et al. | 242/336 |
| 5,316,236 | 5/1994 | Hasegawa et al. | 242/336 |
| 5,568,339 | 10/1996 | Ando | |
| 5,598,984 | 2/1997 | Lee et al. | 242/336 X |
| 5,669,569 | 9/1997 | Lee | |

FOREIGN PATENT DOCUMENTS 2281451  11/1990  Japan ........................................ 242/336

*Primary Examiner*—Donald P. Walsh
*Assistant Examiner*—William A. Rivera
*Attorney, Agent, or Firm*—Sughrue, Mion, Zinn, Macpeak & Seas, PLLC

[57] ABSTRACT

A reel table moving mechanism selectively receives tape cassettes having different sizes. The mechanism includes a deck member in which a head drum and a tape guiding unit are installed and having first and second openings formed to be spaced from each other, each having a predetermined length. A pair of reel tables, operative to move along the first and second openings, selectively receive first and second tape cassettes of a different size. Each reel table has a stopper for locking a pair of reels and a releasing lever for releasing the stopper. A pair of first and second reel bases on which the reel tables are mounted are slidably supported to the deck member. First and second shafts are supported by a supporting mechanism at one side of each of the first and second openings and are slidably connected to the first and second bases. A mechanism moves the first and second reel bases, and first and second releasing devices release each releasing lever of the first and second tape cassettes from being locked. According to the above mechanism, the structure is simplified, and the reel table can be stably maintained.

10 Claims, 8 Drawing Sheets

REEL TABLE MOVING MECHANISM OF TAPE RECORDER

BACKGROUND OF THE INVENTION

The present invention relates to a reel table moving mechanism of a tape recorder such as a video tape recorder (VTR), a camcorder or a digital-video cassette recorder (D-VCR) and, more particularly, to a reel table moving mechanism of a tape recorder for selectively receiving tape cassettes of a different size.

Figure 1:
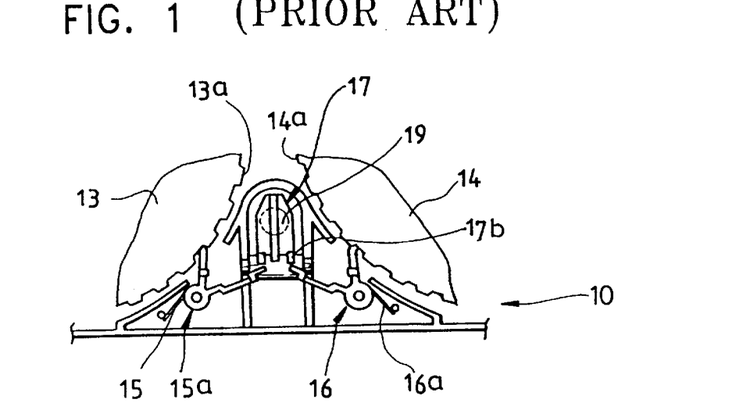
FIG. 1 is a schematic plan view showing a reel stopping device of a conventional tape cassette.
Figure 2:
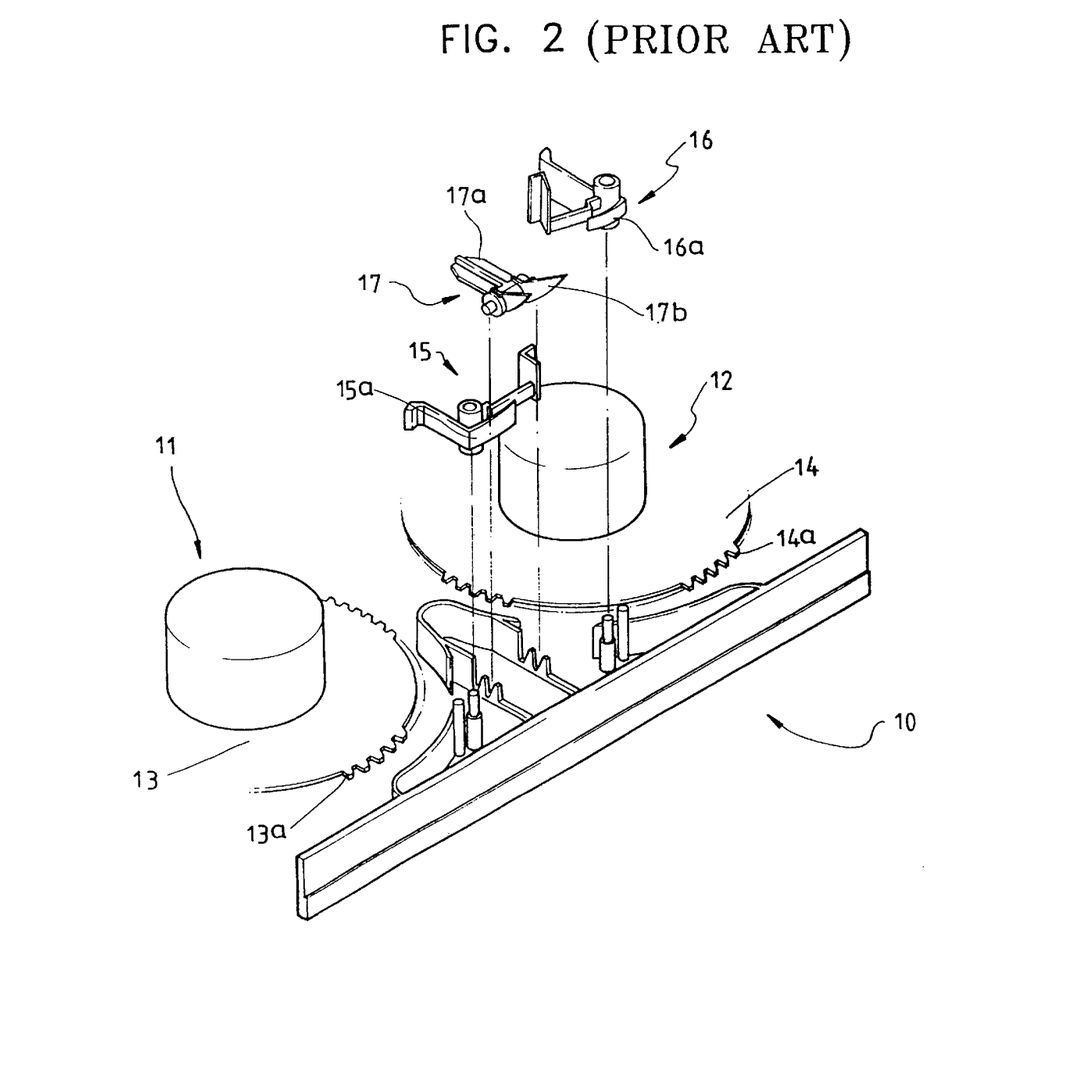
FIG. 2 is an exploded perspective view of FIG. 1.

As shown in FIGS. 1 and 2, a supply reel 11 and a take-up reel 12 where a magnetic tape is wound, are rotatably provided in a standard tape cassette 10. Flanges 13 and 14 under each reel 11 and 12 have gears 13a and 14a, respectively. In the case where the tape cassette 10 is not used, a stopping means for stopping the two reels 11 and 12 is provided in order to prevent the tape from becoming loose due to the winding of the two reels.

The stopping means includes a pair of stoppers 15 and 16 rotatably installed between the two reels 11 and 12 being spaced by a predetermined interval, and the stoppers 15 and 16 are elastically biased by elastic pieces 15a and 16a, respectively, to be engaged with the gears 13a and 14a of the flanges 13 and 14, respectively. A releasing lever 17 for releasing two stoppers 15 and 16 from the gears 13a and 14a is rotatably installed between the two stoppers. One end portion 17a of the releasing lever 17 is located correspondingly to a hole 19 (see FIG. 1) formed in the bottom surface of the tape cassette 10, and the other end portion 17b thereof is interlocked with each stopper 15 and 16 while being rotated.

Accordingly, the tape recorder requires a releasing means for rotating the releasing lever 17 in order to release the reels 11 and 12 from the stoppers 15 and 16 while the tape cassette 10 is loaded.

Figure 3:
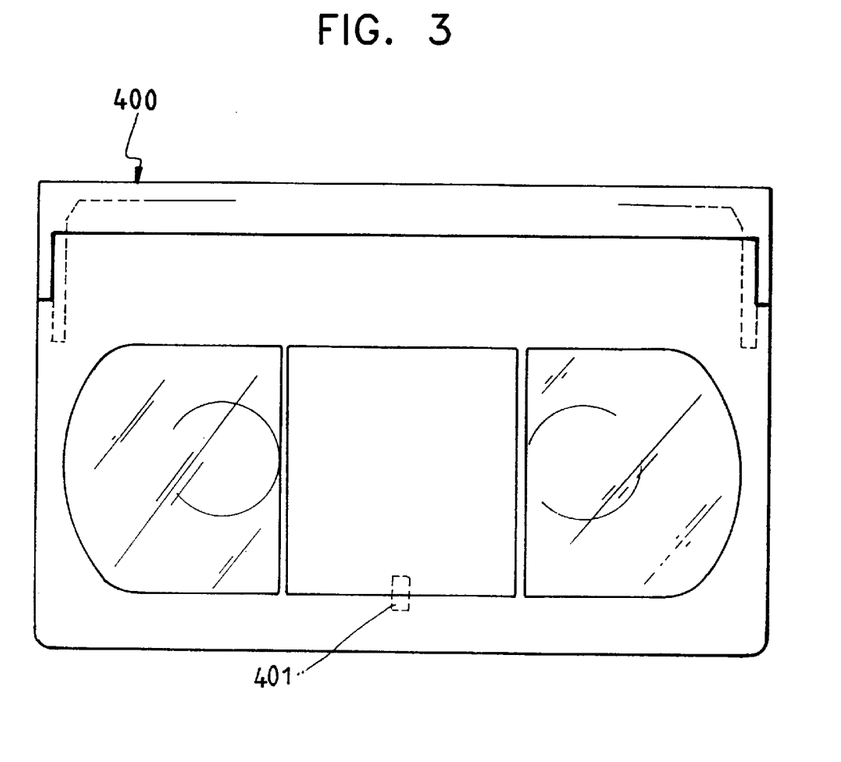
FIGS. 3 and 4 are plan views showing each tape cassette of a different size.
Figure 4:
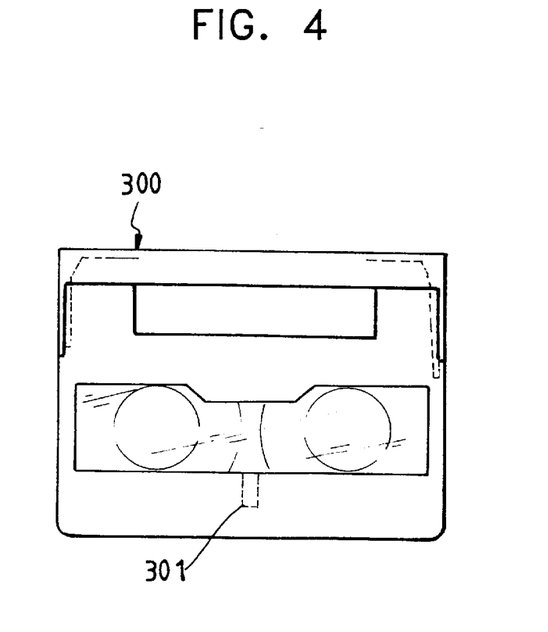

As shown in FIGS. 3 and 4, in tape cassettes 400 and 300 having a different size, holes 401 and 301 for operating the releasing lever 17 are positioned differently. Accordingly, a releasing means which adequately corresponds to each tape cassette 400 and 300 is required.

Further, the tape recorder employing the reel table moving mechanism requires a means for stably fixing the reel table.

SUMMARY OF THE INVENTION

Accordingly, it is an object of the present invention to provide a movement mechanism for a reel table of a tape recorder, for selectively receiving tape cassettes having a different size.

To accomplish the above object of the present invention, there is provided a reel table moving mechanism of a tape recorder operative to selectively receive first and second tape cassettes of a different size, comprising: a deck member in which a head drum and a tape guiding unit are installed and having first and second openings formed to be spaced apart from each other and each having a predetermined length; a pair of reel tables, operative to move along the first and second openings, for selectively receiving the first and second tape cassettes of a different size, each of the first and second tape cassettes having a stopper for locking a pair of reels and a releasing lever for releasing the stopper; a pair of first and second reel bases on which the reel tables are respectively mounted; first and second shafts disposed at one side of each of the first and second openings and slidably connected to the first and second reel bases, respectively; supporting means, fixed to said deck member, for supporting said first and second shafts; means for moving the first and second reel bases; and first and second releasing means for releasing each releasing lever of the first and second tape cassettes from being locked.

The supporting means comprises: a pair of first supporting members which support opposite end portions of said first shaft and a pair of second supporting members which support opposite end portions of said second shaft, said first and second supporting members each having one end being fixed to a bottom surface of the deck member and the other end formed with a first supporting portion for supporting one side of a corresponding one of the first and second shafts and a second supporting portion contacting an end of the corresponding one of the first and second shafts; and a fixing pin, fixed to the deck member with respect to each of the end portions of said first and second shafts, for supporting the other side of the corresponding one of the first and second shafts.

The moving means comprises: a rack gear portion formed at the other side of each of the first and second reel bases; a driving motor installed on the deck member; a first gear train for connecting the driving motor to the rack gear portion of the first reel base; and a second gear train for connecting the driving motor to the rack gear portion of the second reel base.

It is preferable that elastic biasing means is provided for elastically biasing each reel table, when the reel tables move to a receiving position of the first and second tape cassettes, in a direction of the movement.

The first and second gear trains each include final gears respectively connected to the rack gear portions of the first and second reel bases, the final gears each including a first gear engaging with a corresponding one of the rack gear portions and a second gear installed coaxially with the first gear and connected to the driving motor, and the elastic bias means includes a spring member connected coaxially to the first and second gears and having one end connected to the first gear and the other end connected to the second gear.

According to the present invention, the reel tables are moved to a predetermined position by the moving means, and then the reel tables are elastically biased in a direction of the movement by the elastic biasing means. Accordingly, each reel table can be prevented from further moving. Also, since the first and second releasing means are provided to a fixed position, the mechanism thereof can be simplified.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENT

Figure 5:
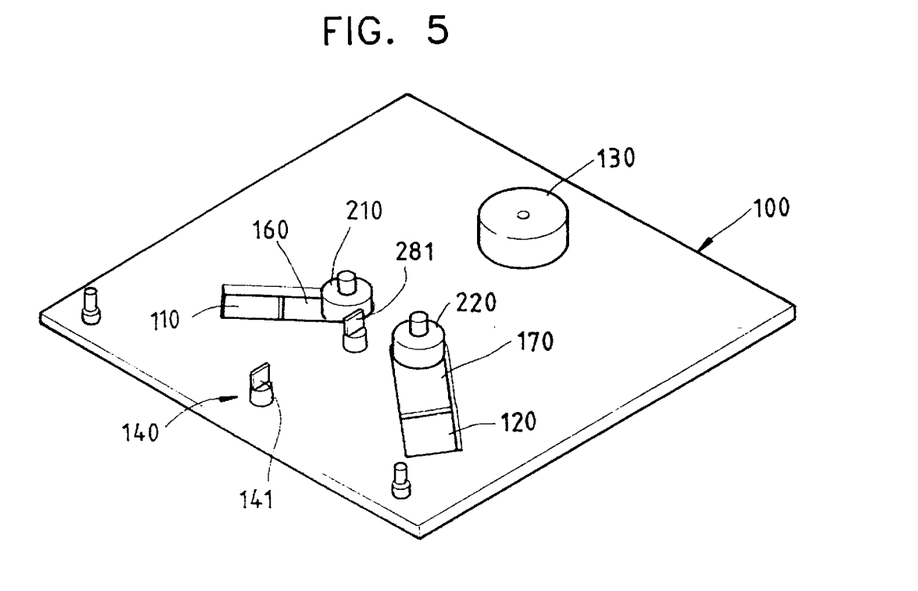
FIG. 5 is a schematic view showing a reel table moving mechanism according to the present invention.
Figure 6:
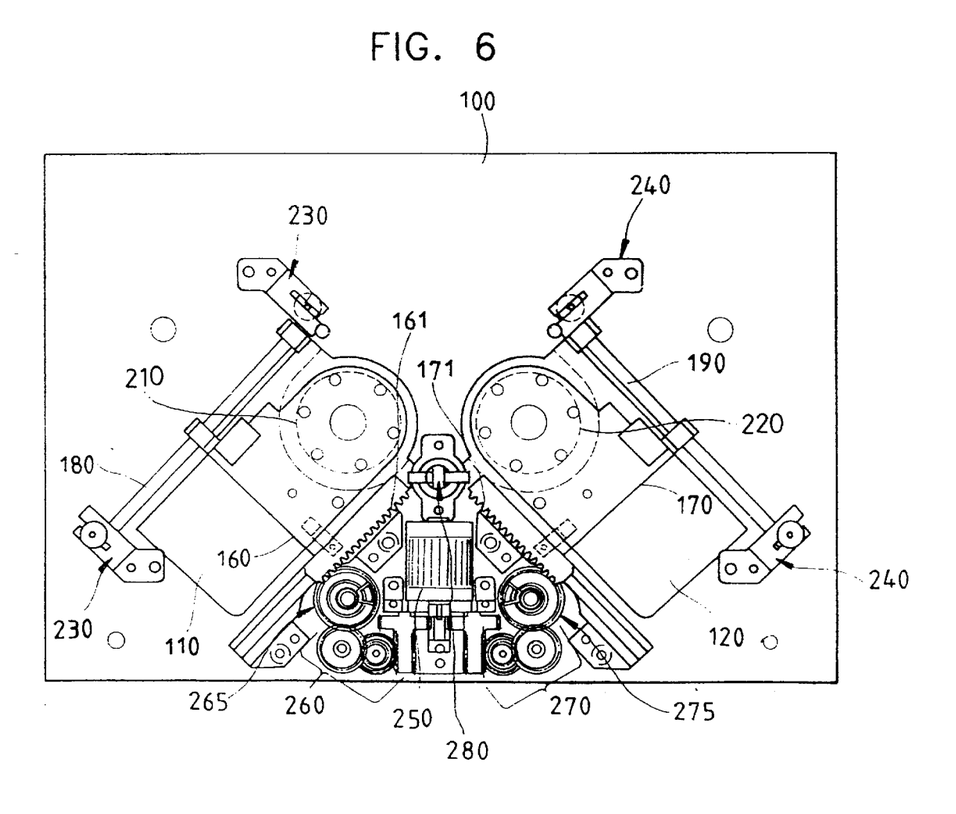
FIGS. 6 and 7 are schematic rear views showing a state wherein a reel table is moved in order to receive each tape cassette having a different size.
Figure 7:
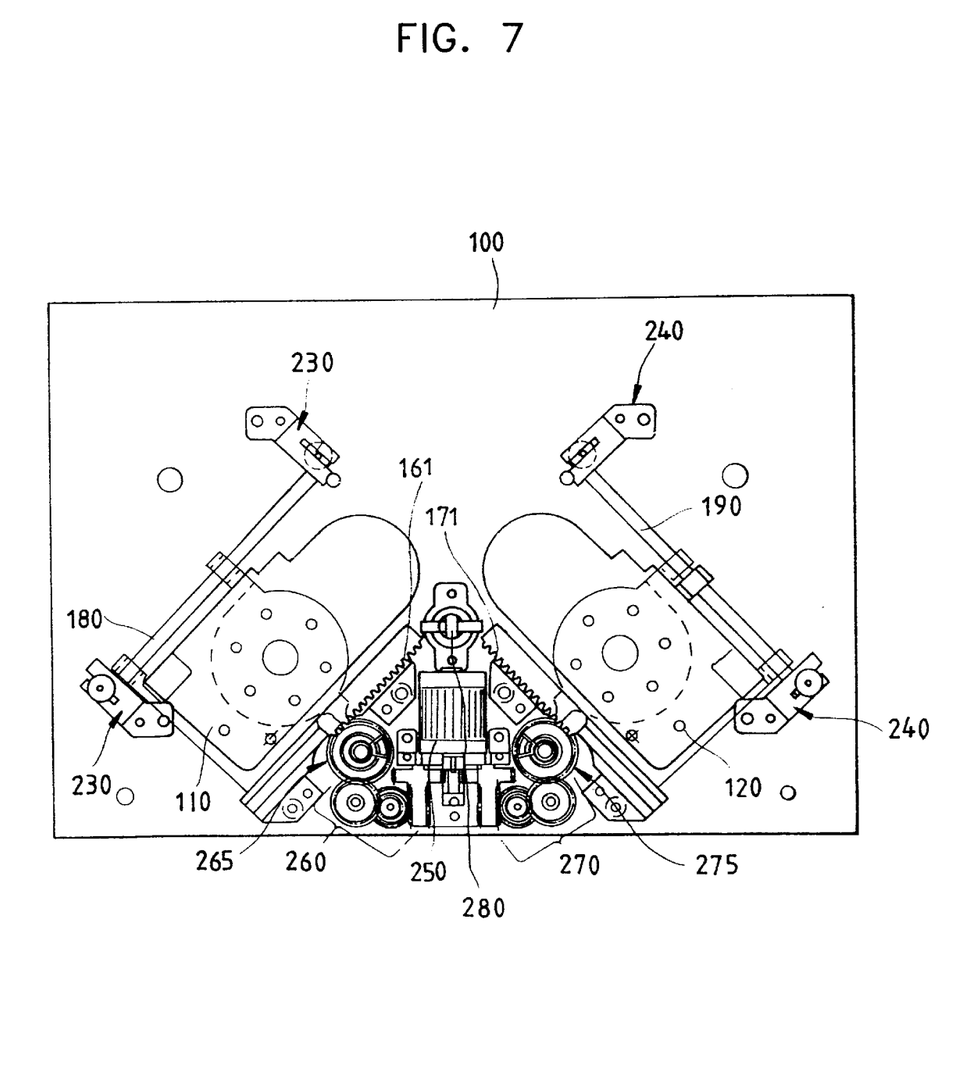
Figure 8:
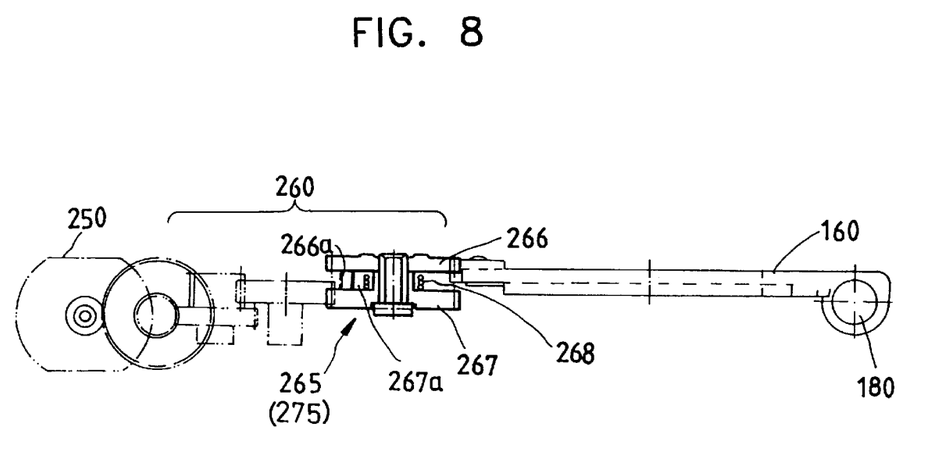
FIG. 8 is a side view of a main portion of FIG. 6.

Referring to FIGS. 5, 6 and 7, showing a reel table moving mechanism according to the present invention, on a deck member 100 where a head drum 130 and a tape guider (not shown) for guiding a tape are installed, first and second openings 110 and 120, having a predetermined length and spaced apart from each other, are formed.

Figure 14:
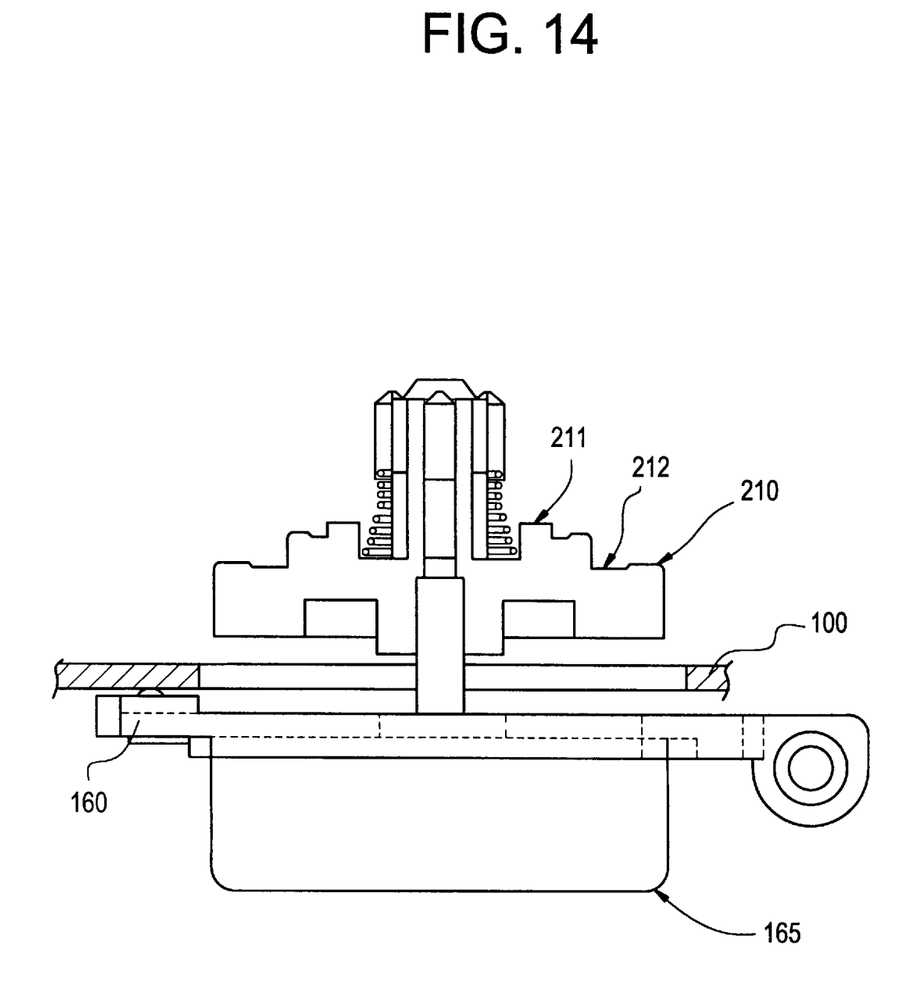
FIG. 14 is a schematic view showing a reel table and a reel motor installed on a reel base.

On the bottom surface of the deck member 100, first and second reel bases 160 and 170 are slidably supported. As shown in FIG. 5, on the first and second reel bases 160 and 170, reel tables 210 and 220 are mounted to pass through the first and second openings 110 and 120, respectively. Under the reel base 160, as shown in FIG. 14, a reel motor 165 for rotating the reel table 210 is installed. The same type of reel motor (not shown) as the motor 165 shown in FIG. 14 is installed under the reel base 170.

Referring to FIGS. 3, 4 and 14, each reel table 210 and 220 includes a first surface 211 for receiving a first tape cassette 300 having a small size and a second surface 212 for receiving a second tape cassette 400 having a large size.

As described above with reference to FIGS. 1 and 2, inside the first and second tape cassettes 300 and 400, stoppers 15 and 16 for locking a pair of reels of each tape cassette and a releasing lever 17 for releasing the stoppers are provided, respectively. In the mechanism according to the present invention, first and second releasing means for releasing the releasing lever 17 of each of the first and second tape cassettes 300 and 400 from locking, are provided.

Also, at the edge of the first and second openings 110 and 120, first and second shafts 180 and 190 supported by predetermined supporting means and slidably connected to the first and second reel bases 160 and 170, respectively, are installed.

The first and second reel bases 160 and 170 slide along the first and second shafts 180 and 190, respectively, by predetermined moving means.

Figure 9:
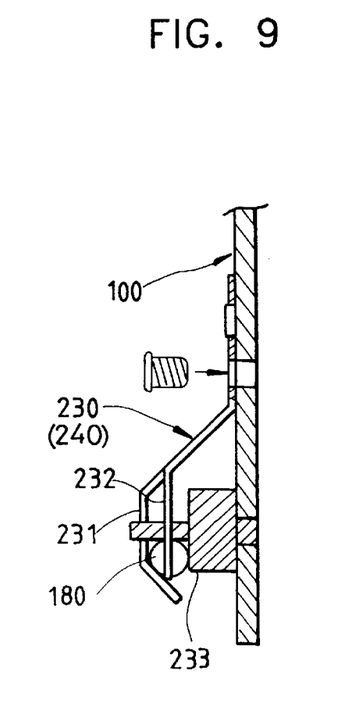
FIG. 9 is a side view showing a support structure of a shaft.

The supporting means includes, as shown in FIGS. 6, 7 and 9, a pair of first elastic supporting members 230 which support opposite end portions of the first shaft 180 and a pair of second elastic supporting members 240 which support opposite end portions of the second shaft 190. Each supporting member 230, 240 has one end fixed to the bottom surface of the deck member 100 and another end on which a first supporting portion 231 is formed for supporting one side of the corresponding first and second shaft 180, 190, and a second supporting portion 232 is formed which contacts with one end of the corresponding first and second shaft 180, 190. The supporting means also includes a fixing pin 233, fixed to the deck member 100 with respect to each of the end portions of the first and second shafts, for supporting the other side of the corresponding one of the first and second shaft 180, 190.

The moving means includes, as shown in FIGS. 6 and 7, rack gear portions 161 and 171 respectively formed inside the first and second reel bases 160 and 170, a driving motor 250 fixed to the deck member 100, a first gear train 260 for connecting the driving motor 250 to the rack gear portion 161 of the first reel base 160, and a second gear train 270 for connecting the driving motor 250 to the rack gear portion 171 of the second reel base 170.

In this case, when the reel tables 210 and 220 are moved to each receiving position corresponding to either the first tape cassette 300 or the second tape cassette 400, elastic biasing means for elastically biasing each reel table 210 and 220 in a direction of the movement are further included. The elastic biasing means can prevent the reel tables 210 and 220 from vibration and stably maintain the receiving position.

Referring to FIGS. 6, 8, and 11 through 13, final gears 265 and 275, respectively connected to the rack gear portions 161 and 171 of the first and second reel bases 160 and 170, each includes a first gear 266 engaging with the corresponding rack gear portions 161 and 171, and a second gear 267 coaxially installed with the first gear 266 and connected to the driving motor 250, respectively. The elastic biasing means includes a spring member 268 connected coaxially to the first and second gears 266 and 267 between the first and second gears 266 and 267, and having one end connected to the first gear 266 and the other end connected to the second gear 267.

Figure 11:
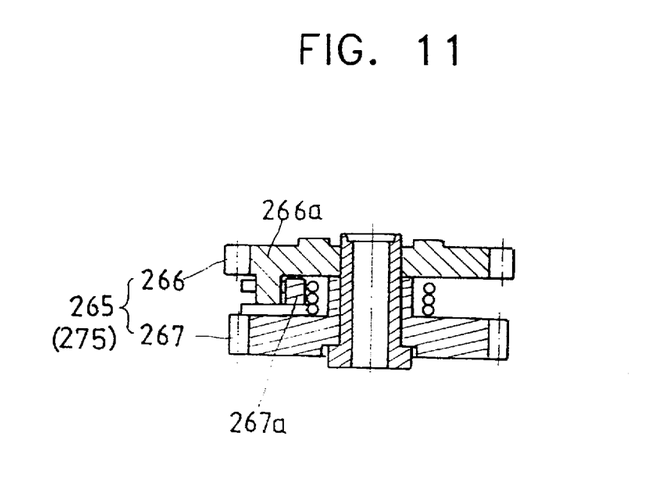
FIG. 11 is a sectional view showing a final gear.
Figure 12:
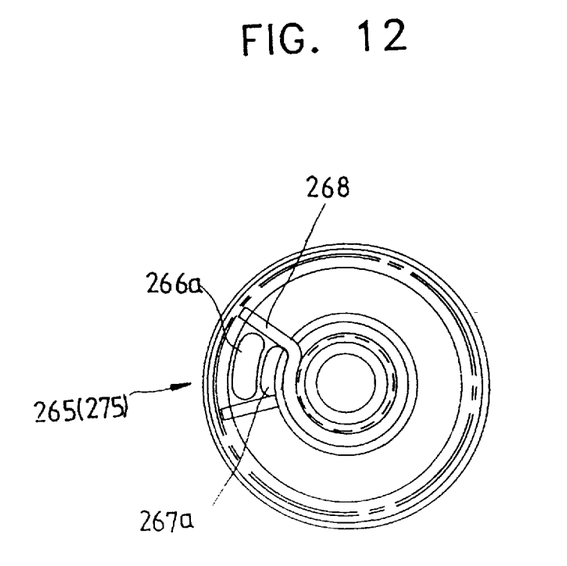
FIGS. 12 and 13 are schematic plan views of the final gear shown in FIG. 11.
Figure 13:
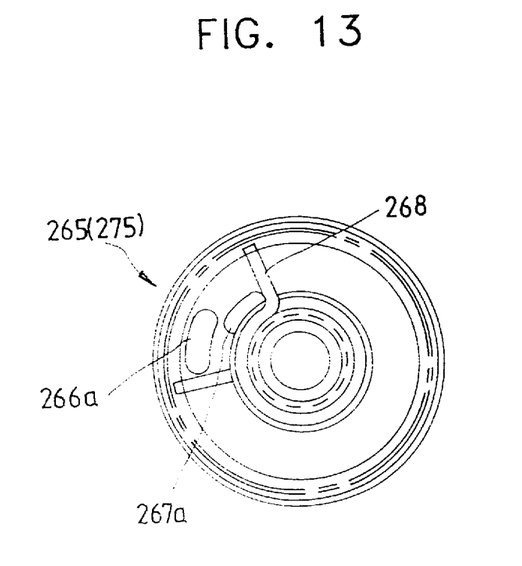

A protrusion 266a is formed downwards from the bottom surface of the first gear 266, and a protrusion 267a is formed upwards from the top surface of the second gear 267. Accordingly, both ends of the spring member 268 are caught on the respective protrusions 266a and 267a, and the first and second reel bases 160 and 170 at the receiving position are elastically biased by the compressional force of the spring member 268 in the movement direction.

Figure 10:
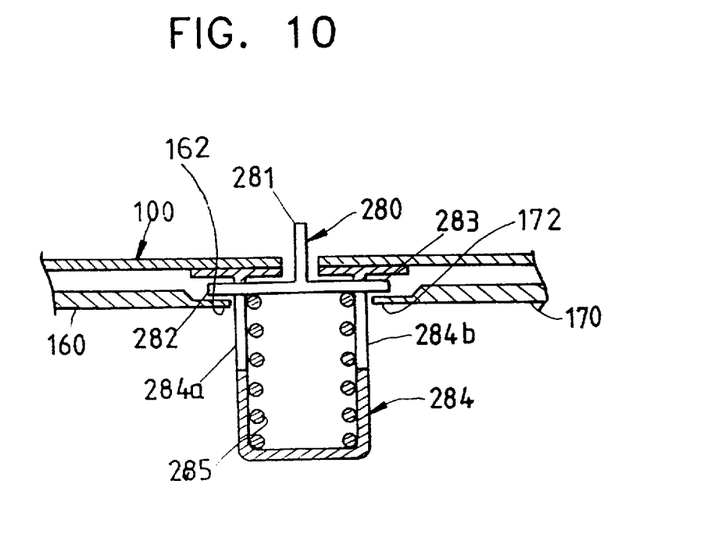
FIG. 10 is a sectional view showing a first releasing means.

Referring to FIGS. 6, 7 and 10, the first releasing means for operating the releasing lever 17 of the first tape cassette 300 includes a cylindrical member 284 fixed to the bottom surface of the deck member 100 and having slits 284a and 284b on the opposing sides thereof, an elevating member 280 having a pair of protrusions 282 and 283 slidably installed on the cylindrical member 284 and protruded outward from the slits 284a and 284b and a first releasing pin 281 capable of being projected above the upper portion of the deck member 100 and operating the releasing lever of the first tape cassette 300, a spring member 285 inserted into the cylindrical member 284 and elastically biasing upwards the elevating member 280, and a means for preventing the elevating member 280 from descending when the first tape cassette 300 is received on the reel tables 210 and 220.

The preventing means is comprised of a pair of supporting protrusions 162 and 172 formed on the surface of the first and second reel bases 160 and 170 and for supporting the protrusions 282 and 283. That is, in a position where the first and second reel bases 160 and 170 are moved in order to receive the first tape cassette 300, as shown in FIGS. 6 and 10, the protrusions 282 and 283 are supported by the supporting protrusions 162 and 172 of the first and second reel bases 160 and 170. In a position where the first and second reel bases 160 and 170 are moved in order to receive the second tape cassette 400, as shown in FIG. 7, the first and second reel bases 160 and 170 are separated from the protrusions 282 and 283. Accordingly, when the second tape cassette 400 is received, the elevating member 280 pressed by the received second tape cassette 400 descends.

Meanwhile, the second releasing means for operating the releasing lever of the second tape cassette 400, as shown in FIG. 5, includes a fixing member 140 fixed to the upper surface of the deck member 100, and having a second releasing pin 141 for operating a releasing lever of the second tape cassette 400.

The operation of reel table moving mechanism of a tape recorder according to the present invention will be described as follows.

First, when the driving motor 250 is operated for the recording/reproducing of the first tape cassette 300, the driving power is transmitted to the first and second reel bases 160 and 170 through the first and second gear trains 260 and 270. At this stage, as the reel bases 160 and 170 move upwards along the first and second shafts 180 and 190, the interval between the reel tables 210 and 220 becomes narrower. Also, at the receiving positions of the reel tables 210 and 220, the first and second reel bases 160 and 170 are elastically biased in the movement direction by the elastic biasing means.

When each reel table 210 and 220 stops in the receiving position, the first tape cassette 300 is received on the reel tables 210 and 220. At this time, the releasing lever of the first tape cassette 300 is released by the first releasing pin 281. Also, since the elevating member 280 is supported by the first and second reel bases 160 and 170, the releasing pin 281 does not descend.

Meanwhile, in the case of recording/reproducing of the second tape cassette 400, the driving motor 250 is driven in a reverse direction and then the first and second reel bases 160 and 170 move downwards as shown in FIG. 7. At this time, the reel tables 210 and 220 are separated to receive the second tape cassette 400. When the second tape cassette 400 is received on the reel tables 210 and 220, the releasing lever of the second tape cassette 400 is operated by a second releasing pin 141. Since the first and second reel bases 160 and 170 are separated from the elevating member 280, the first releasing pin 281 pressed by the received second tape cassette 400 descends.

The moving mechanism according to the present invention, as described above, has the following advantages.

First, since each of the first and second shafts 180 and 190 is supported by an elastic supporting member, vibration or impact thereto is absorbed so that the reel table can be stably supported.

Second, since each reel table is elastically biased in the moving direction thereof by the elastic biasing means, the reel table can be prevented from vibrating.

Third, the first and second releasing means for operating each releasing lever of tape cassettes having a different size are independently provided, to thereby prevent mutual interference.

It should be understood that the invention is not limited to the illustrated embodiment and that many changes and modifications can be made within the scope of the invention by a person skilled in the art.

What is claimed is:

1. A system including a reel table moving mechanism of a tape recorder and first and second tape cassettes of a different size that are selectively received by the reel table moving mechanism of the tape recorder, said first and second tape cassettes each comprising:
   a stopper for locking a pair of reels and a releasing lever for releasing the stopper, and
said reel table moving mechanism comprising:
   a deck member having first and second openings formed to be spaced apart from each other and each having a predetermined length;
   a pair of reel tables, operative to move along said first and second openings, for selectively receiving the first and second tape cassettes of a different size;
   a pair of first and second reel bases on which said reel tables are respectively mounted;
   first and second shafts disposed at one side of each of said first and second openings are slidably connected to said first and second reel bases, respectively;
   supporting means, fixed to said deck member, for supporting said first and second shafts;
   means for moving said first and second reel bases; and
   first and second releasing means for releasing the releasing lever of the first and second tape cassettes from being locked, said first and second releasing means being provided independently of each other to prevent interference therebetween.

2. The system according to claim 1, wherein said supporting means comprises:
   a pair of first supporting members which support opposite end portions of said first shaft and a pair of second supporting members which support opposite end portions of said second shaft, said first and second supporting members each having one end being fixed to a bottom surface of said deck member and another end formed with a first supporting portion for supporting one side of a corresponding one of the first and second shafts and a second supporting portion contacting an end of the corresponding one of the first and second shafts; and
   a fixing pin, fixed to said deck member with respect to each of the end portions of said first and second shafts, for supporting the other side of the corresponding one of said first and second shafts.

3. The system according to claim 1, wherein said moving means comprises:
   a rack gear portion formed at another side of each of said first and second reel bases;
   a driving motor installed on said deck member;
   a first gear train for connecting said driving motor to the rack gear portion of said first reel base; and
   a second gear train for connecting said driving motor to the rack gear portion of said second reel base.

4. The system according to claim 3, further comprising elastic biasing means for elastically biasing each reel table, when said reel tables move to a receiving position of the first and second tape cassettes, in a direction of the movement.

5. The system according to claim 4, wherein said first and second gear trains each include final gears respectively connected to the rack gear portions of said first and second reel bases, said final gears each including a first gear engaging with a corresponding one of the rack gear portions and a second gear installed coaxially with said first gear and connected to said driving motor, and
   said elastic bias means includes a spring member connected coaxially to said first and second gears and having one end connected to said first gear and another end connected to said second gear.

6. The system according to claim 1, wherein said first releasing means comprises:
   a cylindrical member installed under said deck member and having slits on opposing sides thereof;
   an elevating member including a pair of protrusions slidably connected to said cylindrical member and protruded outward through said slits and a first releasing pin, being operative to project over said deck member, for operating the releasing lever of the first tape cassette;
   a spring member, inserted into said cylindrical member, for elastically biasing said elevating member upwards; and means for preventing said elevating member from descending when the first tape cassette is received on said reel table.

7. The system according to claim 6, wherein said preventing means comprises supporting protrusions, formed on the upper surface of said first and second reel bases, for supporting said protrusion pair.

8. The system according to claim 1, wherein said second releasing means comprises a fixing member installed on said deck member, said fixing member having a second releasing pin for operating the releasing lever of the second tape cassette.

9. A reel table moving mechanism of a tape recorder, comprising:
- a deck member having first and second openings formed to be spaced apart from each other and each having a predetermined length;
- a pair of reel tables, operative to move along said first and second openings;
- a pair of first and second reel bases on which said reel tables are respectively mounted;
- first and second shafts disposed at one side of each of said first and second openings are slidably connected to said first and second reel bases, respectively;
- supporting means, fixed to said deck member, for supporting said first and second shafts;
- means for moving said first and second reel bases; and
- first and second releasing means, said first releasing means comprising:
  - a cylindrical member installed under said deck member and having slits on opposing sides thereof;
  - an elevating member including a pair of protrusions slidably connected to said cylindrical member and protruded outward through said slits and a first releasing pin, being operative to project over said deck member;
  - a spring member, inserted into said cylindrical member, for elastically biasing said elevating member upwards; and
  - means for preventing said elevating member from descending.

10. The reel table moving mechanism of a tape recorder according to claim 9, wherein said preventing means comprises supporting protrusions, formed on the upper surface of said first and second reel bases, for supporting said protrusion pair.

* * * * *